United States Patent
Kumar et al.

(10) Patent No.: US 10,201,911 B2
(45) Date of Patent: Feb. 12, 2019

(54) CONTINUOUS PROCESS FOR FORMING A UNITARY MAT

(71) Applicant: BASF SE, Lugwigshafen (DE)

(72) Inventors: Rajesh Kumar, Riverview, MI (US); Eric N. Lawson, Grosse Ile, MI (US)

(73) Assignee: BASF SE, Ludwigshafen am Rhein (DE)

(*) Notice: Subject to any disclaimer, the term of this patent is extended or adjusted under 35 U.S.C. 154(b) by 31 days.

(21) Appl. No.: 15/502,441

(22) PCT Filed: Aug. 5, 2015

(86) PCT No.: PCT/US2015/043813
§ 371 (c)(1),
(2) Date: Feb. 7, 2017

(87) PCT Pub. No.: WO2016/022686
PCT Pub. Date: Feb. 11, 2016

(65) Prior Publication Data
US 2017/0225355 A1    Aug. 10, 2017

Related U.S. Application Data

(60) Provisional application No. 62/034,950, filed on Aug. 8, 2014.

(51) Int. Cl.
| | | |
|---|---|---|
| *B27N 3/00* | (2006.01) | |
| *C08G 18/10* | (2006.01) | |
| *B27N 3/10* | (2006.01) | |
| *C08G 18/20* | (2006.01) | |
| *E04C 2/16* | (2006.01) | |
| *C08G 18/48* | (2006.01) | |
| *C08G 18/64* | (2006.01) | |
| *C08G 18/76* | (2006.01) | |
| *C08G 18/78* | (2006.01) | |
| *C08G 18/08* | (2006.01) | |
| *C08G 18/24* | (2006.01) | |
| *C08G 18/30* | (2006.01) | |
| *C08G 18/32* | (2006.01) | |
| *C08K 5/526* | (2006.01) | |
| *C08G 18/16* | (2006.01) | |
| *C08L 75/04* | (2006.01) | |
| *C08L 97/02* | (2006.01) | |

(52) U.S. Cl.
CPC ........... *B27N 3/002* (2013.01); *B27N 3/00* (2013.01); *B27N 3/10* (2013.01); *C08G 18/0895* (2013.01); *C08G 18/10* (2013.01); *C08G 18/168* (2013.01); *C08G 18/20* (2013.01); *C08G 18/244* (2013.01); *C08G 18/305* (2013.01); *C08G 18/3206* (2013.01); *C08G 18/4841* (2013.01); *C08G 18/6492* (2013.01); *C08G 18/7657* (2013.01); *C08G 18/7664* (2013.01); *C08G 18/7671* (2013.01); *C08G 18/7831* (2013.01); *C08K 5/526* (2013.01); *C08L 75/04* (2013.01); *C08L 97/02* (2013.01); *E04C 2/16* (2013.01)

(58) Field of Classification Search
CPC ........... B27N 3/002; B27N 3/10; C08L 75/04; C08L 97/02; C08G 18/7831; C08G 18/3206; C08G 18/10; C08G 18/168; C08G 18/7671
USPC ........................................ 524/733
See application file for complete search history.

(56) References Cited

U.S. PATENT DOCUMENTS

| | | | |
|---|---|---|---|
| 4,608,407 A | 8/1986 | Kerimis et al. | |
| 4,742,113 A | 5/1988 | Gismond et al. | |
| 5,002,713 A * | 3/1991 | Palardy | C08L 97/02 264/109 |
| 5,093,412 A | 3/1992 | Mente et al. | |
| 5,425,976 A | 6/1995 | Clarke et al. | |
| 6,297,313 B1 | 10/2001 | Hsu | |
| 6,344,165 B1 | 2/2002 | Coleman | |
| 6,352,661 B1 | 3/2002 | Thompson et al. | |
| 6,451,101 B1 | 9/2002 | Mente et al. | |
| 6,458,238 B1 | 10/2002 | Mente et al. | |
| 6,464,820 B2 | 10/2002 | Mente et al. | |

(Continued)

FOREIGN PATENT DOCUMENTS

| | | |
|---|---|---|
| CA | 2860245 A1 | 6/2013 |
| CN | 101443379 A | 5/2009 |

(Continued)

OTHER PUBLICATIONS

International Search Report for Application No. PCT/US2015/043813 dated Oct. 30, 2015, 3 pages.

(Continued)

*Primary Examiner* — Michael Bernshteyn
(74) *Attorney, Agent, or Firm* — DLA Piper LLP (US)

(57) ABSTRACT

A continuous process forms a unitary mat on a line having at least two conveyors spaced from each other. The process includes combining the isocyanate, an isocyanate catalyst, and a plurality of lignocellulosic particles to form a mixture and a self-polymerization product of the isocyanate in-situ in the mixture. The process also includes forming the unitary mat from the mixture on a first conveyer and transferring the unitary mat from the first conveyor to a second conveyor across a predetermined distance while maintaining structural integrity of the unitary mat. The lignocellulosic particles have a moisture content of 0.5 to 30 weight percent of water. Moreover, the continuous process is free of a step of adding water to the isocyanate, the isocyanate catalyst, the lignocellulosic particles, and/or the unitary mat.

17 Claims, 8 Drawing Sheets

(56) References Cited

U.S. PATENT DOCUMENTS

| | | |
|---|---|---|
| 6,638,459 B2 | 10/2003 | Mente et al. |
| 6,649,098 B2 | 11/2003 | Mente et al. |
| 6,822,042 B2 | 11/2004 | Capps |
| 6,846,849 B2 | 1/2005 | Capps |
| 7,422,787 B2 | 9/2008 | Evers et al. |
| 7,439,280 B2 | 10/2008 | Lu et al. |
| 8,440,747 B2 | 5/2013 | Combs et al. |
| 8,486,523 B2 | 7/2013 | Mente |
| 2002/0114892 A1* | 8/2002 | Frick ................. B27N 3/00 427/393 |
| 2005/0242459 A1 | 11/2005 | Savino et al. |
| 2009/0105411 A1 | 4/2009 | Erdem et al. |
| 2009/0114123 A1 | 5/2009 | Clark et al. |
| 2010/0151229 A1* | 6/2010 | Clark ................... B27N 3/083 428/326 |
| 2013/0131230 A1 | 5/2013 | Bouguettaya |
| 2013/0150489 A1 | 6/2013 | Combs et al. |

FOREIGN PATENT DOCUMENTS

| | | |
|---|---|---|
| WO | WO 2012/018934 A1 | 2/2012 |
| WO | WO 2012/018936 A1 | 2/2012 |
| WO | WO 2012/018940 A1 | 2/2012 |

OTHER PUBLICATIONS

Lechti, R.J. et al., "Effect of Synthesis Variables on Tack in Urea-Formalhehyde Resin", J. Adhesion, vol. 25, 1988, pp. 31-44.
Randall, David et al., "The Polyurethanes Handbook", John Wiley & Sons, Ltd., 2002, pp. 395-408.

* cited by examiner

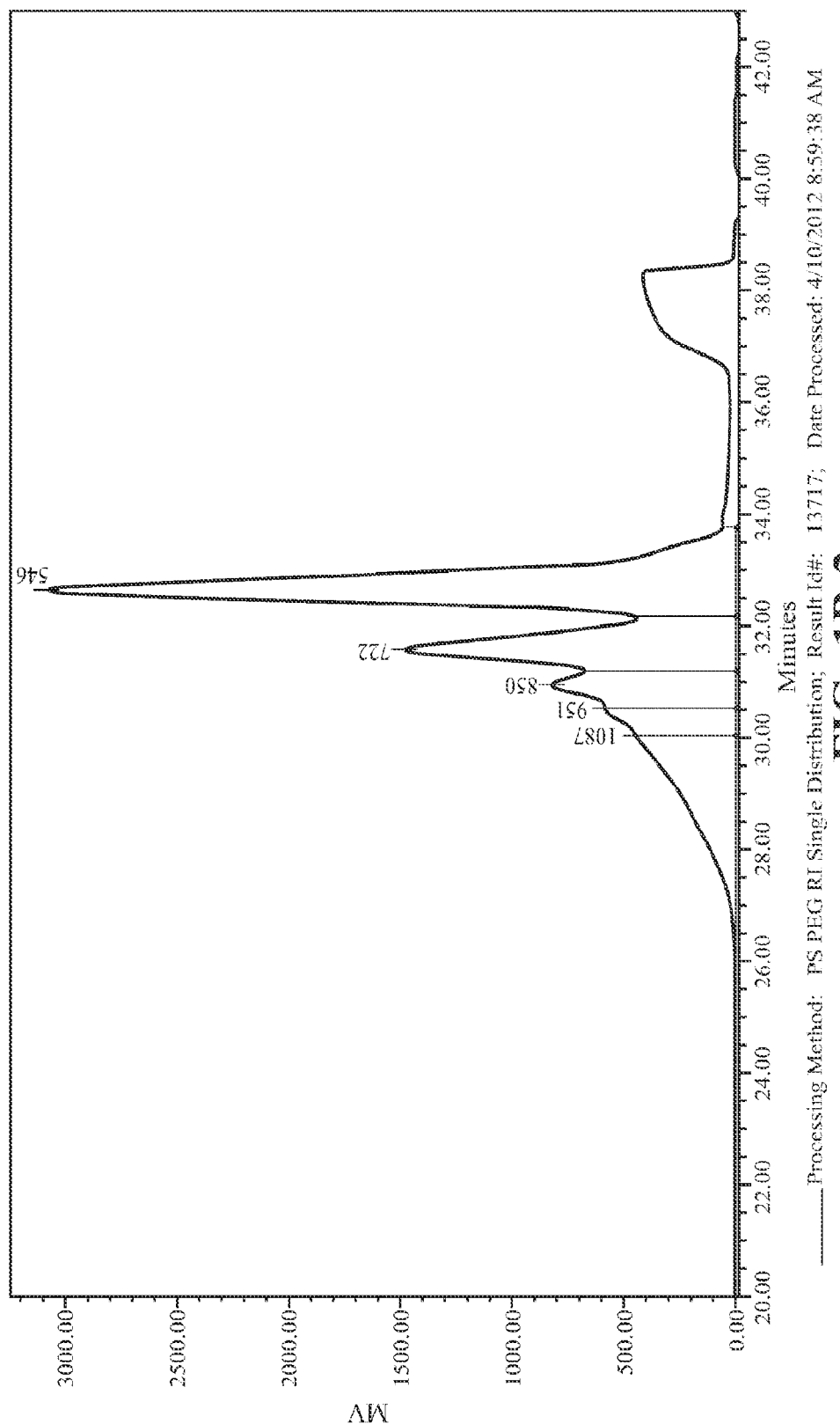

| | Push-Off* Run 10 min., cm | Push-off Run 15 min., cm | Push-off Run 20 min., cm |
|---|---|---|---|
| p-MDI (27.0g) | 2.6 | 2.8 | |
| ISO (25.0g) (pMDI (70) : Catalyst (10) : TEP (20) | 5.8 | | |
| ISO (32.0g) (pMDI (80) : Catalyst (10) : TEP (10) | 6.0 | 4.6 | 2.5 |
| ISO (26.5g) (pMDI (87) : Catalyst (10) : TEP (3) | 5.4 | 5.0 | |
| ISO (29.0g) (pMDI (92) : Catalyst (5) : TEP (3) | 6.1 | 7.3 | |
| ISO (29.0g) (pMDI (92) : Catalyst (5) : TEP (3) | 3.8 | 5.1 | 4.8 |
| ISO (29.0g) (pMDI (82) : Catalyst (3) : TEP (10) : DABCO DC193 (5) | 3.4 | 5.5 | 5.8 |
| ISO (27.0g) (pMDI (82) : Catalyst (3) : TEP (10) : DABCO DC5986 (5) | 3.8 | 5.0 | 5.6 |
| ISO (27.0g) (pMDI (89) : Catalyst (3) : TEP (12) : DEG (3) | 4.3 | 5.9 | 5.4 |
| ISO (25.0g) (pMDI (80) : Catalyst (3) : TEP (15) : BDO (2) | 3.3 | 4.8 | 5.2 |
| ISO (34.0g) (pMDI (80) : Catalyst (3) : TEP (15) : BDO (2) | 5.0 | 7.5 | 5.0 |
| ISO (32.0g) (pMDI (84) : Catalyst (3) : TEP (10) : HDO (3) | 4.3 | 7.0 | 5.8 |
| ISO (33.0g) (pMDI (79) : Catalyst (3) : TEP (15) : HDO (3) | 5.0 | 8.0 | |
| ISO (28.0g) (pMDI (79) : Catalyst (3) : TEP (15) : HDO (3) | 3.8 | 5.6 | 5.4 |
| ISO (29.0g) (pMDI (82) : Catalyst (0.25) : TEP (15) : HDO (3); 100°F | | 6.0 | 5.5 |
| ISO (35.0g) (pMDI (82) : Catalyst (0.50) : TEP (15) : HDO (3); 100°F | | 6.5 – 8.0 | 2.0 – 5.0 |
| ISO (27.0g) (pMDI (69) : Catalyst (3) : TEP (15) : HDO (3) : Prepolymer (10) | 6.0 | 5.6 | 3.4 |
| ISO (29.0g) (pMDI (83) : Catalyst (3) : TEP (10) : HDO (3) : DABCO DC5986 (1) | 3.7 | 5.3 | 6.3 |
| ISO (27.0g) (pMDI (82) : Catalyst (3) : TEP (5) : Hydroxy Terminated Prepolymer (10) | 3.6 | 5.1 | 6.3 |

FIG. 2

| | Number of Mats | Length in. | Width in. | Thick. in. | Dens. lbs/ft³ | Panel Wt lbs | Blend Mater. lbs | MDI lbs | % MC | IB, psi | Avg. MOE | Avg. MOR |
|---|---|---|---|---|---|---|---|---|---|---|---|---|
| Control | 1 | 26 | 26 | 0.75 | 45 (42.7) | 13.2 | 47.53 | 2.14 | 3.0 - 4.0 | NR | 400199 | 2230 |
| 100% pMDI | 2 | 26 | 26 | 0.75 | 45 (42.7) | 13.2 | 47.53 | 2.14 | 3.0 - 4.0 | | | |
| | 3 | 26 | 26 | 0.75 | 45 (42.7) | 13.2 | 47.53 | 2.14 | 3.0 - 4.0 | | | |
| Formula 1 | 1 | 26 | 26 | 0.75 | 45 (43.1) | 13.2 | 47.53 | 2.14 | 3.0 - 4.0 | 143.7 | 283257 | 1784 |
| 98% pMDI, 2% Fomrez UL-28 | 2 | 26 | 26 | 0.75 | 45 (43.1) | 13.2 | 47.53 | 2.14 | 3.0 - 4.0 | 143.7 | | |
| | 3 | 26 | 26 | 0.75 | 45 (43.1) | 13.2 | 47.53 | 2.14 | 3.0 - 4.0 | 143.7 | | |
| Formula 2 | 1 | 26 | 26 | 0.75 | 45 (43.0) | 13.2 | 47.53 | 2.14 | 3.0 - 4.0 | 152.8 | 316784 | 1878 |
| 98% pMDI, 2% DABCO BL-16 | 2 | 26 | 26 | 0.75 | 45 (43.0) | 13.2 | 47.53 | 2.14 | 3.0 - 4.0 | 152.8 | | |
| | 3 | 26 | 26 | 0.75 | 45 (43.0) | 13.2 | 47.53 | 2.14 | 3.0 - 4.0 | 152.8 | | |
| Formula 3 | 1 | 26 | 26 | 0.75 | 45 (43.1) | 13.2 | 47.53 | 2.14 | 3.0 - 4.0 | 161.6 | 316816 | 1912 |
| 96% pMDI, 2% DABCO BL-16, 2% Fomrez UL-28 | 2 | 26 | 26 | 0.75 | 45 (43.1) | 13.2 | 47.53 | 2.14 | 3.0 - 4.0 | 161.6 | | |
| | 3 | 26 | 26 | 0.75 | 45 (43.1) | 13.2 | 47.53 | 2.14 | 3.0 - 4.0 | 161.6 | | |

| | Number of Mats | Length in. | Width in. | Thick. in. | Dens. lbs/ft³ | Panel Wt lbs | Blend Mater. lbs | MDI lbs | % MC | IB, psi | Avg. MOE | Avg. MOR |
|---|---|---|---|---|---|---|---|---|---|---|---|---|
| Control | 1 | 26 | 26 | 0.75 | 45 (38.9) | 13.2 | 47.53 | 2.14 | 5.9 | 257.7 | 352780 | 2377 |
| 100% pMDI | 2 | 26 | 26 | 0.75 | 45 (38.9) | 13.2 | 47.53 | 2.14 | 5.9 | 257.7 | | |
| | 3 | 26 | 26 | 0.75 | 45 (38.9) | 13.2 | 47.53 | 2.14 | 5.9 | 257.7 | | |
| Formula 4 99.75% pMDI 0.25% Fomrez UL-28 | 1 | 26 | 26 | 0.75 | 45 (38.9) | 13.2 | 47.53 | 2.14 | 5.9 | 186.0 | 288718 | 1834 |
| | 2 | 26 | 26 | 0.75 | 45 (38.9) | 13.2 | 47.53 | 2.14 | 5.9 | 186.0 | | |
| | 3 | 26 | 26 | 0.75 | 45 (38.2) | 13.2 | 47.53 | 2.14 | 5.9 | 186.0 | | |
| Formula 5 99.50% pMDI 0.50% Fomrez UL-28 | 1 | 26 | 26 | 0.75 | 45 (38.2) | 13.2 | 47.53 | 2.14 | 5.9 | 163.2 | 270236 | 1794 |
| | 2 | 26 | 26 | 0.75 | 45 (38.2) | 13.2 | 47.53 | 2.14 | 5.9 | 163.2 | | |
| | 3 | 26 | 26 | 0.75 | 45 (38.2) | 13.2 | 47.53 | 2.14 | 5.9 | 163.2 | | |
| Formula 6 99.00% pMDI 1.0% Fomrez UL-28 | 1 | 26 | 26 | 0.75 | 45 (38.9) | 13.2 | 47.53 | 2.14 | 5.9 | 151.9 | 267213 | 1673 |
| | 2 | 26 | 26 | 0.75 | 45 (38.9) | 13.2 | 47.53 | 2.14 | 5.9 | 151.9 | | |
| | 3 | 26 | 26 | 0.75 | 45 (38.9) | 13.2 | 47.53 | 2.14 | 5.9 | 151.9 | | |

| | Number of Mats | Length in. | Width in. | Thick. in. | Dens. lbs/ft³ | Panel Wt lbs | Blend Mater. lbs | MDI lbs | % MC | IB, psi | Avg. MOE | Avg. MOR |
|---|---|---|---|---|---|---|---|---|---|---|---|---|
| Control 100% pMDI (3.75 wt% pMDI based on wood) | 1 | 26 | 26 | 0.75 | 45 (45.5) | 13.5 | 46.56 | 1.63 | 8.2 | 167.7 | N/A | N/A |
| | 2 | 26 | 26 | 0.75 | 45 (45.5) | 13.5 | 46.56 | 1.63 | 8.2 | 167.7 | | |
| | 3 | 26 | 26 | 0.75 | 45 (45.5) | 13.5 | 46.56 | 1.63 | 8.2 | 167.7 | | |
| Formula A 90% pMDI, 10% TEP (3.75 wt% pMDI based on wood) | 1 | 26 | 26 | 0.75 | 45 (46.3) | 13.5 | 46.56 | 1.81 | 8.2 | 156.1 | N/A | N/A |
| | 2 | 26 | 26 | 0.75 | 45 (46.3) | 13.5 | 46.56 | 1.81 | 8.2 | 156.1 | | |
| | 3 | 26 | 26 | 0.75 | 45 (46.3) | 13.5 | 46.56 | 1.81 | 8.2 | 156.1 | | |
| Formula B 86.75% pMDI, 10% TEP, 3% Hexanediol, 0.25% Fomrez UL-28 (3.75 wt% pMDI based on wood) | 1 | 26 | 26 | 0.75 | 45 (46.0) | 13.5 | 46.56 | 2.04 | 8.2 | 132.5 | N/A | N/A |
| | 2 | 26 | 26 | 0.75 | 45 (46.0) | 13.5 | 46.56 | 2.05 | 8.2 | 132.5 | | |
| | 3 | 26 | 26 | 0.75 | 45 (46.0) | 13.5 | 46.56 | 2.06 | 8.2 | 132.5 | | |

FIG. 3C

CONTINUOUS PROCESS FOR FORMING A UNITARY MAT

CROSS-REFERENCE TO RELATED APPLICATIONS

This application is the National Stage of International Patent Application No. PCT/US2015/043813, filed on Aug. 5, 2015, which claims priority to and all the advantages of U.S. Provisional Patent Application No. 62/034,950, filed on Aug. 8, 2014, the content of which is incorporated herein by reference.

FIELD OF THE DISCLOSURE

The present disclosure generally relates to a continuous process for forming a unitary mat including lignocellulosic particles. More specifically, the process utilizes an isocyanate, an isocyanate catalyst, and the lignocellulosic particles and is free of a step of adding water.

DESCRIPTION OF THE RELATED ART

Mats such as oriented strand board (OSB), oriented strand lumber (OSL), particleboard (PB), scrimber, agrifiber board, chipboard, flakeboard, and fiberboard, e.g. medium density fiberboard (MDF), are generally produced by blending or spraying lignocellulosic material with a binder while being mixed in a blender. After blending, the lignocellulosic material is typically coated with the binder and formed into a mat via compression between heated platens/plates to set the binder and to bond the lignocellulosic material together in densified form, such as in a board, panel, or other shapes.

Binders that have been used for making such mats include phenol formaldehyde (PF) resins, urea formaldehyde (UF) resins, and melamine-urea-phenol-formaldehyde (MUPF) resins. However, these resins tend to produce undesirable emissions. To improve on this process, methylene diphenyl diisocyanate (MDI) has been used. However, MDI is unsuitable for use in continuous production processes because it does not allow the lignocellulosic material, as the mat, to remain intact on a continuous process line. More specifically, vibrations and one or more gaps between conveyor belts tend to destroy the integrity of the mats thereby resulting in defective boards. Quite simply, boards made with MDI tend to fall apart when produced on/in a continuous process line. Accordingly, there remains opportunity for improvement.

SUMMARY OF THE DISCLOSURE

This disclosure provides a continuous process for forming a unitary mat on a line having at least two conveyors spaced from each other. The process includes combining the isocyanate, an isocyanate catalyst, and a plurality of lignocellulosic particles to form a mixture and a self-polymerization product of the isocyanate in-situ in the mixture. The process also includes forming the unitary mat from the mixture on a first conveyer and transferring the unitary mat from the first conveyor to a second conveyor across a predetermined distance while maintaining structural integrity of the unitary mat. The lignocellulosic particles have a moisture content of 0.5 to 30 weight percent of water. Moreover, the continuous process is free of a step of adding water to the isocyanate, the isocyanate catalyst, the lignocellulosic particles, and/or the unitary mat.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 3A is a first table that includes data as reported in the Examples;

FIG. 3B is a second table that includes data as reported in the Examples; and

FIG. 3C is a third table that includes data as reported in the Examples.

DETAILED DESCRIPTION OF THE DISCLOSURE

Figures 1, 1A:
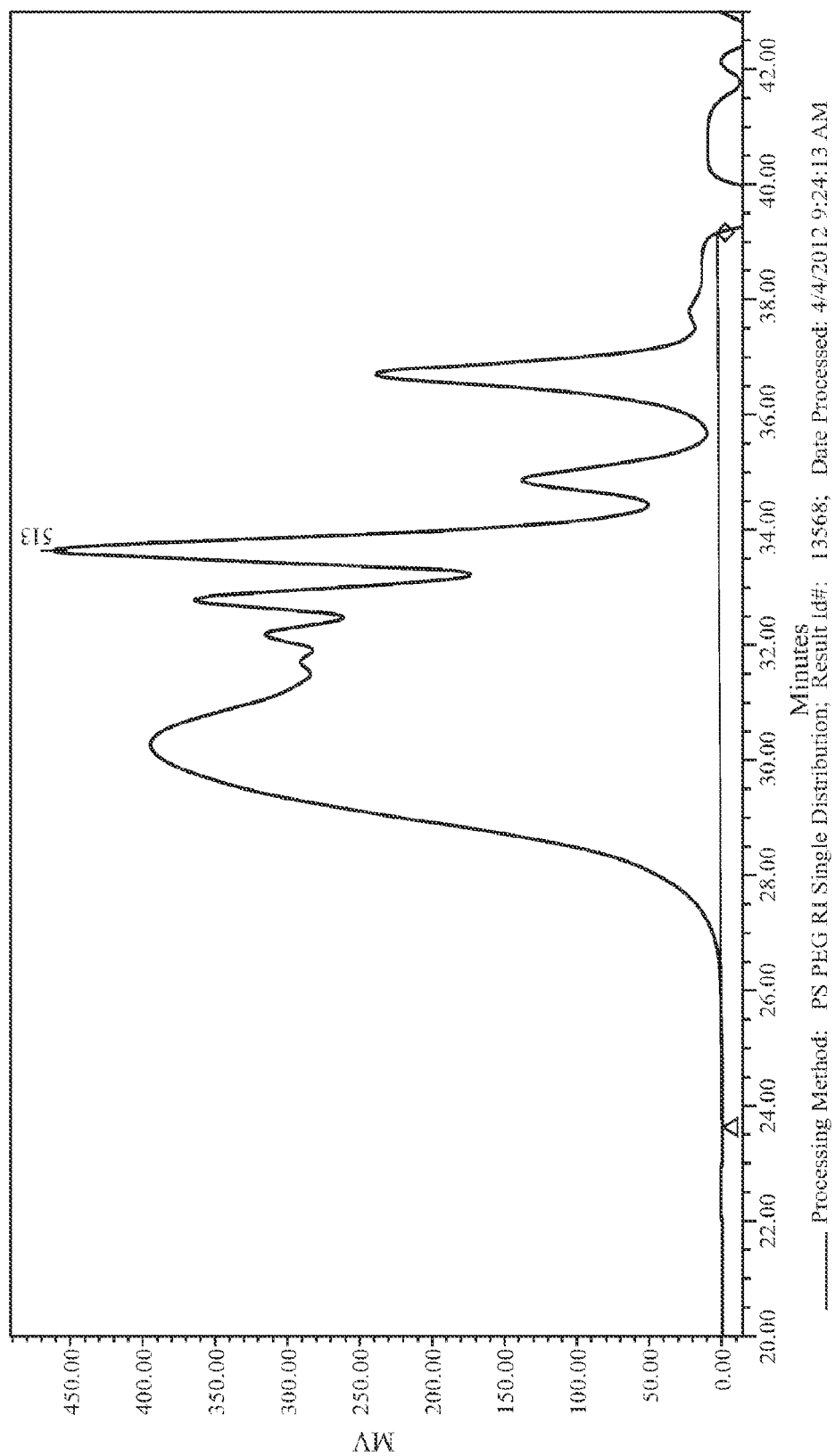
FIG. 1A is a gel permeation chromatogram showing formation of higher molecular weight oligomers of polyurea from the reaction of moisture with pMDI (24 h.) in the presence of Fomrez UL-1 isocyanate catalyst.

This disclosure provides a continuous process for forming a mat and the mat itself. The mat may be described as a unitary mat. The terminology unitary may describe that the mat is a single cohesive piece. Alternatively, the mat may be described as one-piece, unbroken, complete, intact, undivided, integral, undamaged, etc. In other embodiments, the mat is described as being formed using the process such that the mat does not break into pieces or break apart during the process. Alternatively, the mat may be described as maintaining structural integrity throughout the process.

The mat has a length and a width. The mat also has a thickness. Typically the mat has an undetermined, continuous, unbroken length when formed in the continuous process. However, the mat is eventually cut into a predetermined final size, e.g. after pressing. Typically, the mat has a width of from 4 to 12, 5 to 11, 6 to 10, 7 to 9, 5 to 10, or 6 to 8, feet. The mat typically has a thickness of from 0.1 to 6, 0.2 to 4, 0.25 to 1, 0.2 to 0.9, 0.3 to 0.8, 0.4 to 0.7, or 0.5 to 0.6, inches. The mat can have a consistent width and/or thickness across an entirety or only a part of the length. Similarly, the mat can have a consistent length and/or thickness across an entirety or only a part of the width. The mat can be symmetrical or asymmetrical and can be any shape including, but not limited to, square, rectangular, round, etc. All values and ranges of values between and including those described above may also be utilized in various non-limiting embodiments.

The mat is not particularly limited and can be used in various applications. Examples of such applications include, but are not limited to, for packaging; for furniture and cabinetry; for roof and floor sheathing; for roof, floor, and siding paneling; for window and door frames; and for webstock, e.g. webstock for engineered I-beams.

The mat, in various embodiments, can be referred to as various forms of engineered lignocellulosic composites, e.g. as engineered wood composites, such as oriented strand board (OSB); oriented strand lumber (OSL); scrimber; fiberboard, such as low density fiberboard (LDF), medium density fiberboard (MDF), and high density fiberboard (HDF); chipboard; flakeboard or flake board; particleboard (PB); plywood; etc. Generally, the mat is in the form OSB, OSL, PB, scrimber, plywood, LDF, MDF, or HDF, more typically in the form of PB, MDF, HDF, or OSB. However, it is to be appreciated that the mat may be in other engineered wood forms, such as, but not limited to, those described and exemplified herein. It is to be appreciated that the names of lignocellulosic composite articles are often used interchangeably in the art. For example, one may refer to a composite as OSB whereas another may refer to the same composite as flake board.

The mat may be of various sizes, shapes, and thickness. For example, the mat can be configured to mimic conventional composite mats, such as OSB, PB, scrimber, and MDF beams, boards, or panels. The mat can also be of various complex shapes, such as moldings, fascias, furniture, etc. In certain embodiments, the mat is fiberboard, e.g. MDF. In other embodiments, the mat is OSB, scrimber, or OSL. In yet other embodiments, the mat is PB. The mat can include one or more layers. For example, if the mat is OSB, the mat can include one layer, e.g. a core layer, two layers, e.g. a core layer and a face/fascia layer, or three or more layers, e.g. a core layer and two fascia layers.

In certain embodiments, such as for OSB applications, the mat has a first fascia layer including a first portion of the plurality of lignocellulosic particles compressed together and substantially oriented in a first direction. The mat further can have a second fascia layer spaced from and parallel to the first fascia layer and including a second portion of the plurality of lignocellulosic particles compressed together and substantially oriented in the first direction. The mat yet further can have a core layer disposed between the first and second fascia layers and including a remaining portion of the plurality of lignocellulosic particles compressed together and substantially oriented in a second direction different than the first direction. The layers can each include different adhesive systems, depending on the specific components utilized in the respective adhesive systems of the layers. In certain embodiments, at least one of the layers, e.g. one or both of the fascia layers, can include PF resin. Each of the layers can be of various thicknesses, such as those encountered with conventional OSB layers. OSL typically has a plurality of lignocellulosic particles substantially orientated in only one direction. Other types of composite mats, e.g. wood composites, and their processes of manufacture, that can be formed, e.g. by utilizing the adhesive system, are described by pages 395 through 408 of The Polyurethanes Handbook (David Randall & Steve Lee eds., John Wiley & Sons, Ltd. 2002), which is incorporated herein by reference in its entirety in one or more non-limiting embodiments.

The mat has an original thickness, i.e., a thickness after manufacture, e.g. after pressing the mat to form the final, i.e., cured, mat. In various embodiments, the mat exhibits a swelling of less than about 10%, less than about 5%, or less than about 3%, based on a 24-hour cold-soak test according to ASTM D1037. The thickness can vary, but is typically of from about 0.25 to about 10, about 0.25 to about 5, or about 0.25 to about 1.5, inches, or any subrange in between. It is to be appreciated that describing thicknesses may not be suitable when describing complex shapes other than boards or panels. As such, the mat can be of various dimensions based on final configuration of the mat.

The mat has an internal bond (IB) strength. The IB strength can be greater than about 20, greater than about 30, greater than about 40, greater than about 50, greater than about 60, greater than about 70, greater than about 80, greater than about 90, or greater than about 100, pounds per square inch (psi), according to ASTM D1037. In certain embodiments, the mat has an IB strength of from about 50 to about 500, about 100 to about 300, or about 150 to about 250, psi, according to ASTM D1037, or any subrange in between. All values and ranges of values between and including those described above may also be utilized in various non-limiting embodiments.

IB strength is a tensile property. Typically, in conventional mats, as IB strength increases, flexural properties such as modulus of elasticity (MOE) and modulus of rupture (MOR) change, specifically, MOE generally decreases as IB strength increases.

In various embodiments, the mat has a MOE greater than 75,000, greater than 95,000, greater than 100,000, or greater than 110,000, psi, according to ASTM D1037. Typically, the mat has a MOR greater than 3,000, greater than 3,250, greater than 3,300, or greater than 3,500, psi, according to ASTM D1037. All values and ranges of values between and including those described above may also be utilized in various non-limiting embodiments.

In various embodiments, the mat has a Push Off Test Extension value that is similar to that of a comparative mat formed using a urea-formaldehyde resin, wherein the terminology "similar" would be understood by those of skill in the art. In various embodiments, the mat has a Push Off Test Extension value that is within 1, 2, 3, 4, 5, 6, 7, 8, 9, 10, 15, 20, or 25, percent, of that of such a comparative mat. All values and ranges of values between and including those described above may also be utilized in various non-limiting embodiments.

The mat may have a push off value of 3, 4, 5, 6, 7, 8, 9, or 10 inches, or any value or range of values therebetween. The push off value can be calculated as described in the Examples and may vary based on temperature and whether the mat is being evaluated on a conveyor, as is understood by those in the art. All values and ranges of values between and including those described above may also be utilized in various non-limiting embodiments.

In various embodiments, cold tack can be measured using a device adapted from an apparatus described by R. J. Leicht in the Journal of Adhesion, 1998, vol. 25, pages 31-44, which is incorporated herein by reference in its entirety in one or more non-limiting embodiments, to push a prepressed mat over the edge of a table assembly so that the length at which the mat breaks defines the cold tack performance of the binder used to prepare the mat. This test for measuring cold tack described below is referred to herein as the "Push Off Test". Accordingly, the values obtained therefrom can be described as the aforementioned Push Off Test Extension values.

In the Push Off test, the modified device used to measure cold tack typically includes a hydraulic cylinder connected to an electric motor that is attached to a wooden platform. A polytetrafluoroethylene "T" can be affixed to the end of the cylinder pushrod. A sample of the mat to be test can be prepared such that it has a height of 2 inches (5 cm) in a wooden form positioned on a metal plate covered with a smooth polyethylene film sheet. A flat-topped wooden insert that fits snugly into the form can then be placed on top of the furnish and the metal plate holding the form and furnish can then be placed under a Power Pod C-press from Black Brothers Company. The press is typically equipped with two air pods pressurized to 90 psi to create a calculated total force of 280 psi applied for 90 seconds to form a 9"×6"×1"(22.9 cm×15.2 cm×2.5 cm) pressed mat. The mat on the plastic-covered metal plate is then typically placed in front of the pushrod and the edge of the mat can be aligned with the edge of the platform using the motorized hydraulic cylinder. A timer and a programmed push at the rate of 1.67 inches (4.2 cm) per minute can then be started simultaneously. The time for the first break in the mat and the weight of material that falls onto the balance are then recorded. In other embodiments, the test used to generate these values can be any described in U.S. Pat. No. 8,440,747 and/or the Journal of Adhesion, 1998, vol. 25, pages 31-44, each of which is expressly incorporated herein in various non-limiting embodiments.

Plurality of Lignocellulosic Particles:

The mat includes a plurality of lignocellulosic particles. The plurality of lignocellulosic particles may be alternatively described as lignocellulosic material or lignocellulosic pieces. The lignocellulosic material may be alternatively described as a plurality of lignocellulosic pieces. The plurality of lignocellulosic particles can be derived from a variety of lignocellulosic materials. Generally, the plurality of lignocellulosic particles is derived from wood; however, the plurality of lignocellulosic particles can be derived from other lignocellulosic materials, such as from bagasse, straw, flax residue, nut shells, cereal grain hulls, etc., and mixtures thereof. If wood is utilized as the lignocellulosic material, the plurality of lignocellulosic particles can be prepared from various species of hardwoods and/or softwoods. Non-lignocellulosic materials in flake, fibrous or other particulate form, such as glass fiber, mica, asbestos, rubber, plastics, etc., can also be mixed with plurality of lignocellulosic particles. However, such materials are not required.

The plurality of lignocellulosic particles can come from a variety of processes, such as by comminuting small logs, industrial wood residue, branches, rough pulpwood, etc. into pieces in the form of sawdust, chips, flakes, wafer, strands, scrim, fibers, sheets, etc. In certain embodiments, the plurality of lignocellulosic particles includes those pieces typically utilized for forming OSB, OSL, scrimber, and particleboards (PB). In other embodiments, the plurality of lignocellulosic particles includes those pieces typically utilized for forming fiberboards, such as LDF, MDF, and HDF. In yet another embodiment, the plurality of lignocellulosic particles includes those pieces typically utilized for forming plywood. It is to be appreciated that the mat can include various combinations of the aforementioned materials and/or pieces, such as strands and sawdust. In addition, the mat may be formed into shapes other than panels and boards.

The plurality of lignocellulosic particles can be produced by various conventional techniques. For example, pulpwood grade logs can be converted into flakes in one operation with a conventional roundwood flaker. Alternatively, logs and logging residue can be cut into fingerlings on the order of from about 0.5 to about 3.5 inches long with a conventional apparatus, and the fingerlings flaked in a conventional ring type flaker. The logs are typically debarked before flaking. The mat is not limited to any particular process of forming the plurality of lignocellulosic particles.

The dimensions of the plurality of lignocellulosic particles are not particularly critical. In certain embodiments, such as those used to form OSB, the plurality of lignocellulosic particles typically includes strands having an average length of from about 2.5 to about 6 inches, an average width of from about 0.5 to about 2 inches, and an average thickness of from about 0.1 to about 0.5 inches. It is to be appreciated that other sizes can also be utilized, as desired by one skilled in the art. In some of these embodiments, the mat may include other types lignocellulosic particles, such as chips, in addition to the strands. In certain embodiments, strands which are typically about 1.5 inches wide and about 12 inches long can be used to make laminated strand lumber, while strands typically about 0.12 inches wide and about 9.8 inches long can be used to make parallel strand lumber. In certain embodiments, such as those used to form flakeboard, the plurality of lignocellulosic particles includes flakes having an average length of from about 2 to about 6 inches, an average width of about 0.25 to about 3 inches, and an average thickness of from about 0.005 to about 0.05 inches. In other embodiments, such as those used to from scrimber, the plurality of lignocellulosic particles includes thin, irregular pieces having average diameters ranging from about 0.25 to about 20, about 0.5 to about 15, or about 1 to about 10, mm, and lengths ranging from several inches to several feet in length. Detailed information on suitable sizes and shapes of the plurality of lignocellulosic particles, e.g., scrim, as well as processes of manufacturing scrimber, is described in U.S. Pat. No. 6,344,165 to Coleman, the disclosure of which is incorporated herein by reference in its entirety in a non-limiting embodiment. In yet other embodiments, the plurality of lignocellulosic particles are those typically used to form conventional PB. The plurality of lignocellulosic particles can be further milled prior to use, if such is desired to produce a size more suitable for producing a desired mat. For example, hammer, wing beater, and toothed disk mills may be used for forming the plurality of lignocellulosic particles of various sizes and shapes.

The plurality of lignocellulosic particles has a moisture content and cannot be dry (i.e., have a moisture content of less than 0.5 weight percent) because water typically serves as an isocyanate-reactive component. The plurality of lignocellulosic particles typically has a moisture content of 0.5 to 30 weight percent of water, based on 100 parts by weight of the plurality of lignocellulosic particles. In various other embodiments, the plurality of lignocellulosic particles has a moisture content of from 0.5 to 25, 0.5 to 20, 0.5 to 15, 0.5 to 10, 0.5 to 5, 1 to 25, 1 to 20, 1 to 15, 1 to 10, 1 to 5, 2 to 15, 3 to 12, or 5 to 10, weight percent of water, based on 100 parts by weight of the plurality of lignocellulosic particles. The water can assist in the curing or setting of the mat. The moisture of the plurality of lignocellulosic particles is typically inherent in that independent or external water is typically not added. In fact, the process of this disclosure is free of a step of adding water. All values and ranges of values between and including those described above may also be utilized in various non-limiting embodiments.

The plurality of lignocellulosic particles is utilized in the mat in various amounts, depending on the type of mat desired to be formed. Typically, such as in OSB, PB, scrimber, or MDF applications, the plurality of lignocellulosic particles is utilized in an amount of from about 75 to about 99, about 85 to about 98, about 90 to about 97, or about 92 to about 95.5, parts by weight, based on 100 parts by weight of the mat, or any subrange in between. It is to be appreciated that the amounts can be higher or lower depending on various factors, including moisture content of the plurality of lignocellulosic particles. For example, moisture content of the plurality of lignocellulosic particles can vary by geographic location, source, etc., such as variations from mill to mill.

The mat also includes a self-polymerization product of an isocyanate, and may optionally include a polyurethane and/or a polyurea, each of which is not particularly limited and may be any in the art. The polyurethane and/or polyurea may be further defined as a reaction product of an isocyanate and an isocyanate-reactive component that is reactive with the isocyanate. The amount of the polyurethane in the mat may vary depending on when a sample is chosen to test. For example, if a sample is measured at the beginning of the process of forming the mat, the amount may be lower or higher than if the sample is measured later. The same concept applies to the polyurea and/or the self-polymerization product. The polyurethane and/or polyurea may be present in an amount as compared to an original amount of the isocyanate used. For example, the amount of the polyurethane and/or polyurea may represent 1, 2, 3, 4, 5, 10, 15, 20, 25, 30, 35, 40, 45, 50, 55, 60, 65, 70, 75, 80, 85, 90, 95, or even greater mole percent based on a 100 percent mole basis of the isocyanate used. All values and ranges of values between and including those described above may also be utilized in various non-limiting embodiments.

Isocyanate:

In various embodiments, the isocyanate is typically a polyisocyanate having two or more functional groups, e.g. two or more isocyanate (NCO) groups. Said another way, the isocyanate can just be an isocyanate or a combination of isocyanates. Suitable organic polyisocyanates include, but are not limited to, conventional aliphatic, cycloaliphatic, araliphatic and aromatic isocyanates. In certain embodiments, the isocyanate is selected from the group of diphenylmethane diisocyanates (MDIs), polymeric diphenylmethane diisocyanates (pMDIs), and combinations thereof. Polymeric diphenylmethane diisocyanates can also be called polymethylene polyphenylene polyisocyanates. In other embodiments, the isocyanate is an emulsifiable MDI (eMDI). Examples of other suitable isocyanates include, but are not limited to, toluene diisocyanates (TDIs), hexamethylene diisocyanates (HDIs), isophorone diisocyanates (IPDIs), naphthalene diisocyanates (NDIs), and combinations thereof. In a specific embodiment, the isocyanate is MDI. In another specific embodiment, the isocyanate is pMDI, i.e., polymeric methylene-4,4'-diphenyl diisocyanate. In further specific embodiments, the isocyanate is a combination of MDI and pMDI.

In certain embodiments, the isocyanate is an isocyanate-terminated prepolymer. The isocyanate-terminated prepolymer is a reaction product of an isocyanate and a polyol and/or a polyamine. The isocyanate may be any type of isocyanate in the polyurethane art, such as one of the polyisocyanates. If utilized to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. The polyol may also be a polyol as described and exemplified further below with discussion of the isocyanate-reactive component. If utilized to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may be formed from a combination of two or more of the aforementioned polyols and/or polyamines.

Other suitable isocyanates include those described in U.S. Pat. Nos. 4,742,113 to Gismondi et al.; 5,093,412 to Mente et al.; 5,425,976 to Clarke et al.; 6,297,313 to Hsu; 6,352,661 to Thompson et al.; 6,451,101 to Mente et al.; 6,458,238 to Mente et al.; 6,464,820 to Mente et al.; 6,638,459 to Mente et al.; 6,649,098 to Mente et al.; 6,822,042 to Capps; 6,846,849 to Capps; 7,422,787 to Evers et al.; 7,439,280 to Lu et al.; and 8,486,523 to Mente; and U.S. Publication No. 2005/0242459 to Savino et al.; the disclosures of which are incorporated herein by reference in their entirety to the extent they do not conflict with the general scope of the present invention.

Specific examples of suitable isocyanates are commercially available from BASF Corporation of Florham Park, N.J., under the trademark LUPRANATE®, such as LUPRANATE® M, LUPRANATE® M20, LUPRANATE® MI, LUPRANATE MM103, LUPRANATE® M20SB, LUPRANATE® M20HB, and LUPRANATE® M20FB isocyanates. In one embodiment, the isocyanate is LUPRANATE® M20. In another embodiment, the isocyanate is LUPRANATE® M20FB. It is to be appreciated that the isocyanate may include any combination of the aforementioned isocyanates and/or isocyanate-terminated prepolymers.

In still other embodiments, the isocyanate is further defined as a pure liquid or solid (wherein the terminology "pure" is as appreciated in the isocyanate arts), as an isocyanate prepolymer (NCO terminated and/or hydroxyl terminated), an allophanate-isocyanate, a biuret-isocyanate, an isocyanate-isocyanate, a carbodiimide-isocyanurate, a polyurethane-isocyanate hybrid, a polyurea-isocyanate hybrid, and/or combinations thereof. In one embodiment, the isocyanate has a number average molecular weight of from 255 to 280 g/mol, a weight average molecular weight of from 470 to 550 g/mol, a viscosity of from 170 to 200 cP measured at 25° C., and a surface tension of 41 to 46 mN/m measured at 25° C.

Alternatively, the isocyanate may be present in or utilized in an organic emulsion. For example, the isocyanate may be present in as a dispersed phase in an emulsion having 50 to 99, 50 to 95, 55 to 90, 60 to 85, 65 to 80, or 70 to 80, or 75, weight percent of a continuous phase.

In still other embodiments, the isocyanate has a percent NCO of from 0 to 33, from 5 to 30, from 10 to 25, or from 15 to 20. In additional embodiments, any value, or range of values, both whole and fractional, within or between any one or more values described above are contemplated.

The isocyanate typically has a viscosity which is suitable for specific applications of the isocyanate to the plurality of lignocellulosic particles, such as by spraying, fogging and/or atomizing the isocyanate to apply the isocyanate to the plurality of lignocellulosic particles. Typically, the isocyanate has a viscosity of from about 100 to about 5,000, about 100 to about 2,500, or about 100 to about 1,000, cps at 25° C. according to ASTM D2196, or any subrange in between.

Relative to forming a polyurethane, the isocyanate is typically reacted with an isocyanate-reactive component that typically is or includes a polyol or a compound having more than one hydroxyl group. Any polyol, or compound having more than one hydroxyl group, known in the art or described below may be utilized. For example, the plurality of lignocellulosic particles may include more than one hydroxyl group such that the plurality of lignocellulosic particles may react with the isocyanate.

Polyol:

In various embodiments, the polyol is chosen from conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Other suitable polyols include, but are not limited to, biopolyols, such as soybean oil, castor-oil, soy-protein, rapeseed oil, etc., and combinations thereof. Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

Amines:

Referring now to forming a polyurea, the isocyanate-reactive component typically is or includes an amine. Any amine known in the art may be utilized. For example, the amine may be chosen from MDA, TDA, ethylene-, propylene- butylene-, pentane-, hexane-, octane-, decane-, dodecane-, tetradecane-, hexadecane-, octadecanediamines, Jeffamines-200, -400, -2000, -5000, hindered secondary amines like Unilink 4200, Curene 442, Polacure 740, Ethacure 300, Lonzacure M-CDEA, Polyaspartics, 4,9 Dioxadodecan-1,12-diamine, and combinations thereof. In other embodiments, the amine is chosen from Lupragen® API—N-(3-Aminopropyl)imidazole, Lupragen® DMI—1,2-Dimethylimidazole, Lupragen® DMI—1,2-Dimethylimidazole, Lupragen® N 100—N,N-Dimethylcyclohexylamine, Lupragen® N 101—Dimethylethanolamine, Lupragen® N 103—N,N-Dimethylbenzylamine, Lupragen® N 104—N-Ethylmorpholine, Lupragen® N 105—N-Methylmorpholine, Lupragen® N 106—2,2'-Dimorpholinodiethylether, Lupragen® N 107—Dimethylaminoethoxyethanol, Lupragen® N 201—TEDA in DPG, Lupragen® N 202—TEDA in BDO, Lupragen® N 203—TEDA in MEG, Lupragen® N 204—N,N'-Dimethylpiperazine, Lupragen® N 205—Bis(2-dimethylaminoethyl) ether, Lupragen® N 206—Bis(2-dimethylaminoethyl)ether, Lupragen® N 301—Pentamethyldiethylenetriamine, Lupragen® N 301—Pentamethyldiethylenetriamine, Lupragen® N 400—Trimethylaminoethylethanolamine, Lupragen® N 500—Tetramethyl-1,6-hexandiamine, Lupragen® N 500—Tetramethyl-1,6-hexanediamine, Lupragen® N 600—S-Triazine, Lupragen® N 700—1,8-Diazabicyclo-5,4,0-undecene-7, Lupragen® NMI—N-Methylimidazole, and combinations thereof.

Self-Polymerization Product:

Referring now to the self-polymerization product of the isocyanate, this self-polymerization product may be the self-polymerization product of any of the isocyanates set forth above or known in the art. As is understood in the art, the self-polymerization product may be different at different points during a reaction, e.g. when a sample is taken. Moreover, as is also understood in the art, temperature, pressure, and time may also affect formation of the self-polymerization product, where a particular reaction ends, etc. In addition, as is also appreciated in the art, the self-polymerization product may be affected by kinetic and or thermodynamic considerations.

For example, the self-polymerization product may be further defined as the self-polymerization product of polymeric methylene-4,4'-diphenyl diisocyanate and may be or include the following:

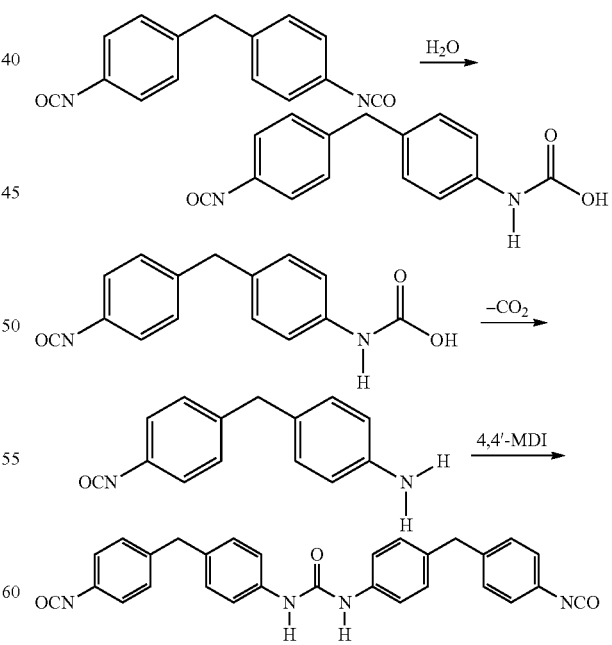

Alternatively, any other self-polymerization product of any one or more of the aforementioned isocyanates may also be utilized. However, the self-polymerization product may be present in an amount not described above because it can be difficult to quantify a precise amount. For example, the amount typically increases with time and temperature until all of the isocyanate is converted into di-, tri-, and finally polyurea. In other words, the amount of the self-polymerization product in the mat may vary depending on when a sample is chosen to test. For example, if a sample is measured at the beginning of the process of forming the mat, the amount may be lower or higher than if the sample is measured later. The self-polymerization product may be present in an amount as compared to an original amount of the isocyanate used. For example, the amount of the may represent 1, 2, 3, 4, 5, 10, 15, 20, 25, 30, 35, 40, 45, 50, 55, 60, 65, 70, 75, 80, 85, 90, 95, or even greater mole percent based on a 100 percent mole basis of the isocyanate used. All values and ranges of values between those described above may also be present. To further illustrate this concept, FIGS. 1A-1B include gel permeation chromatograms wherein FIG. 1A shows formation of higher molecular weight oligomers of polyurea from the reaction of moisture with pMDI (24 h.) in the presence of Fomrez UL-1 isocyanate catalyst while FIG. 1B shows pMDI alone. Typically, the mat will always include some amount of the self-polymerization product at some point in the process.

Isocyanate Catalyst:

Referring now to the isocyanate catalyst, this catalyst may be any in the art. In one embodiment, the isocyanate catalyst is an amine catalyst. In another embodiment, the isocyanate catalyst is an organometallic catalyst.

The isocyanate catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the isocyanate catalyst is or includes dibutyltin dilaurate, which is a dialkyltin(IV) salt of an organic carboxylic acid. Specific examples of non-limiting isocyanate catalysts are commercially available from Air Products and Chemicals, Inc. of Allentown, Pa., under the trademark DABCO®. The isocyanate catalyst can also include other dialkyltin(IV) salts of organic carboxylic acids, such as dibutyltin diacetate, dibutyltin maleate and dioctyltin diacetate.

Examples of other suitable but non-limiting isocyanate catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting isocyanate catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting isocyanate catalysts include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino) propylimidazole, and combinations thereof. In various embodiments, the isocyanate catalyst is commercially available from Air Products and Chemicals, Inc. under the trademark POLYCAT®. The isocyanate catalyst may include any combination of one or more of the aforementioned catalysts.

In still other embodiments, the catalyst is chosen from DABCO TMR, DABCO TMR-2, DABCO HE, DABCO 8154, PC CAT DBU TA 1, PC CAT Q1, Polycat SA-1, Polycat SA-102, salted forms, and/or combinations thereof.

In other embodiments, the catalyst is chosen from dibutyltin dilaurate, dibutyltin oxide (e.g. as a liquid solution in C8-C10 phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethylti n bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyitin maleate, dibutyltin mercaptopropionate, dibutyltin bis (isoodyithioglycolate), dibutyltin diacetate, dioctyltin oxide mixture, dioctyltin oxide, dibutyltin diisooctoate, dibutyltin dineodecanoate, dibutyltin carboxylate, dioctyitin carboxylate, and combinations thereof.

The isocyanate catalyst may promote a —NCO/H$_2$O reaction to form low molecular weight oligomers of polyurea adhesive. Alternatively, the isocyanate catalyst may promote a self-polymerization reaction of the isocyanate. The isocyanate catalyst may also promote a reaction of the isocyanate and a polyol to form a polyurethane.

The isocyanate catalyst can be utilized in various amounts. For example, in various embodiments, the isocyanate catalyst is utilized in an amount of from 0.0001 to 10, from 0.0001 to 5, from 5 to 10, weight percent based on a total weight percent of the mixture or the isocyanate, or any other value or range of values therebetween. Typically, an amount of catalyst used depends on a temperature of the process. For example, at 150° F., 0.0001% may be utilized while at room temperature 5-10% may be utilized. In various embodiments, an amount of catalyst is chosen such that the rate of formation of one or more of the self-polymerization product, the polyurethane, and/or the polyurethane, is controlled and that the mat has enough strength (green-strength or cold-tack) to maintain structural integrity during transfer.

Triethyl Phosphate (TEP):

In another embodiment, the isocyanate catalyst is present in or utilized as a combination with triethyl phosphate (TEP). Alternatively, TEP may be utilized and present in the process and/or the mat independent from the isocyanate catalyst. TEP has the chemical formula $(C_2H_5)_3PO_4$ or $(C_2H_5)_3P=O$ and may also be referred to as "phosphoric acid, triethyl ester". TEP is typically classified as a polar nonionic solvent. In certain embodiments, it is believed that TEP acts as a phase transfer catalyst for the reactions of isocyanates (e.g. MDI, pMDI, etc.) with proton donating materials such as water, polyols and/or polyamines. TEP can also act as a solvent between the components, e.g. isocyanates, water, and various polyols and/or polyamines that are soluble in TEP. It is believed that TEP allows the reaction to occur at a faster rate and at lower temperatures by removing phase barriers between normally immiscible liquid reactants. An example is in the reaction between water and MDI/pMDI to form polyurea linkages. Another example is the formation of polyurethane linkages, e.g. when one or more polyols are utilized. The inclusion of TEP may allow for shorter pressing times for the manufacture of the mat by facilitating reaction of the components. In embodiments utilizing highly viscous isocyanate resins (e.g. those that are thick, semisolid, or solid at room temperature), TEP can be utilized to reduce viscosity, which eases handling, manufacture, etc. For example, TEP can be blended with such resins to reduce/remove heating requirements, to reduce burden on pumping equipment, to promote faster application, to promote faster reaction, etc. It is also believed that use of TEP unexpectedly allows the plurality of lignocellulosic particles to have increased tack and increased Push Off values such that the mat stays intact when formed and utilized in the continuous process. In various embodiments, TEP is utilized in an amount from 0 to 20, 5 to 20, or 10 to 15 weight percent based on a total weight percent of the mixture. In various non-limiting examples, the TEP is utilized in an amount equivalent to about 20 g of TEP in combination with 65 g of isocyanate and 15 g of a combination of an isocyanate catalyst and polyol, ±1, 2, 3, 4, 5, 10, 15, 20, or 25,%.

Carrier Polyol:

The isocyanate catalyst may alternatively be present in or utilized as a combination with a carrier polyol. Alternatively, the carrier polyol may be utilized and present in the process and/or the mat independent from the isocyanate catalyst. In various embodiments, the carrier polyol is utilized in an amount from 0 to 20, 5 to 20, or 10 to 15 weight percent based on a total weight percent of the mixture. In various non-limiting examples, the carrier is utilized in an amount equivalent to about 20 g of the carrier polyol in combination with 65 g of isocyanate and 15 g of a combination of an isocyanate catalyst and TEP, ±1, 2, 3, 4, 5, 10, 15, 20, or 25,%. In various other embodiments, the carrier polyol has a weight average molecular weight of from 50 to 2,000, from 50 to 1,500, from 50 to 1,000, from 50 to 500, from 100 to 450, from 150 to 400, from 200 to 350, or from 250 to 300, g/mol. Suitable but non-limiting examples of carrier polyols include ethane diol, propane diol, diethylene glycol, triethylene glycol, dipropylene glycol, tripropylene glycol, glycerine, pentaerythritol, trimethylolpropane, butane diol, hexane diol, octane diol, decane diol, dodecane diol, tetradecane diol, hexadecane diol, octadecane diol, bisphenol A, bisphenol F, and combinations thereof.

At any one or more points in the continuous process, the mat and/or the mixture may include a reactive intermediate of an isocyanate polymerization reaction, e.g. a biuret, triuret, allophanate, etc. In one embodiment, the mixture and/or the mat includes a biuret of polymeric methylene-4,4'-diphenyl diisocyanate. This reactive intermediate may be formed in-situ prior to the step of forming the mat, which is described in greater detail below.

In one example, the mat and/or the mixture may include one or more compounds set forth below or formed as follows:

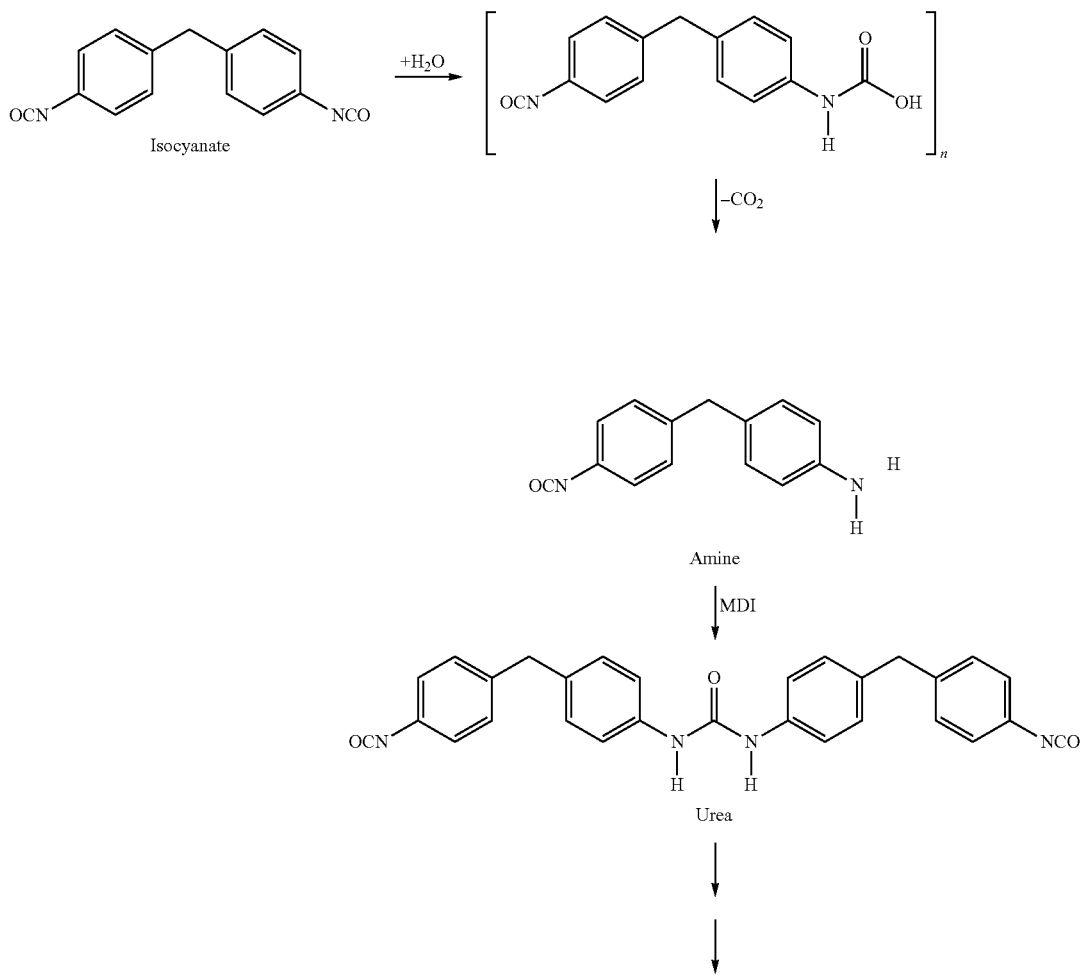

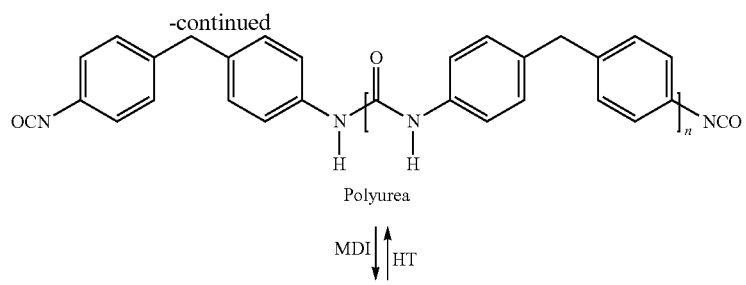
Polyurea
MDI ↕ HT
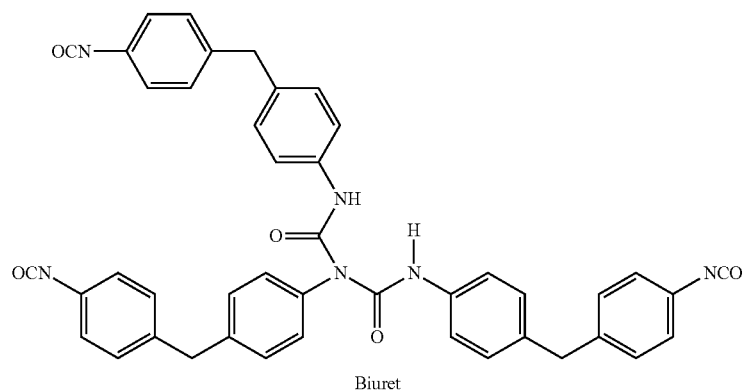
Biuret
In still another embodiment, the mat and/or the mixture may include one or more compounds set forth below or formed as follows:
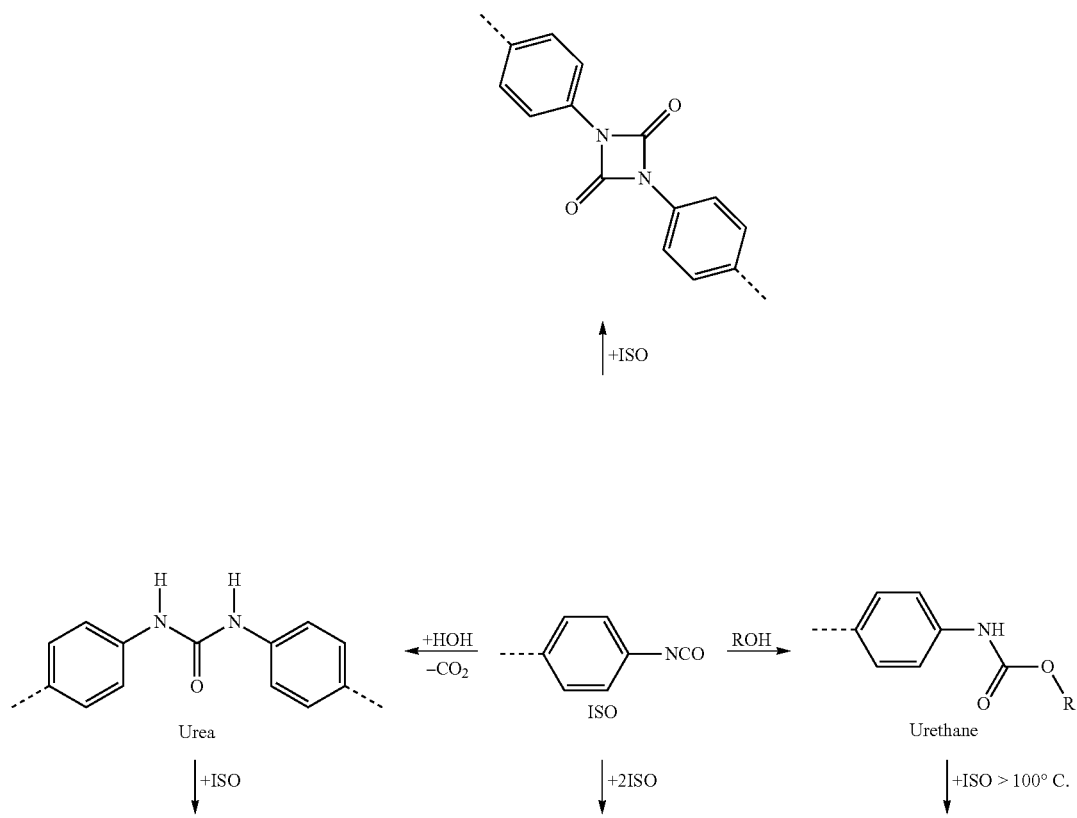

-continued

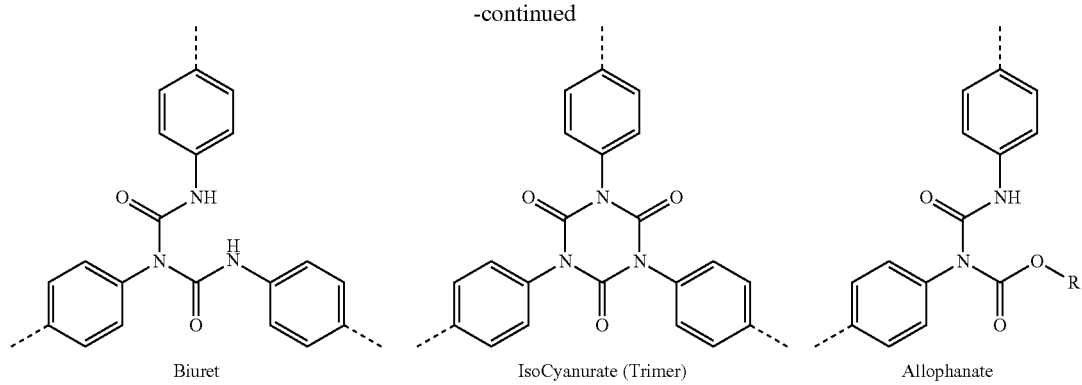

Biuret     IsoCyanurate (Trimer)     Allophanate

In an even further embodiment, the mat and/or the mixture may include one or more compounds set forth below or formed as follows:

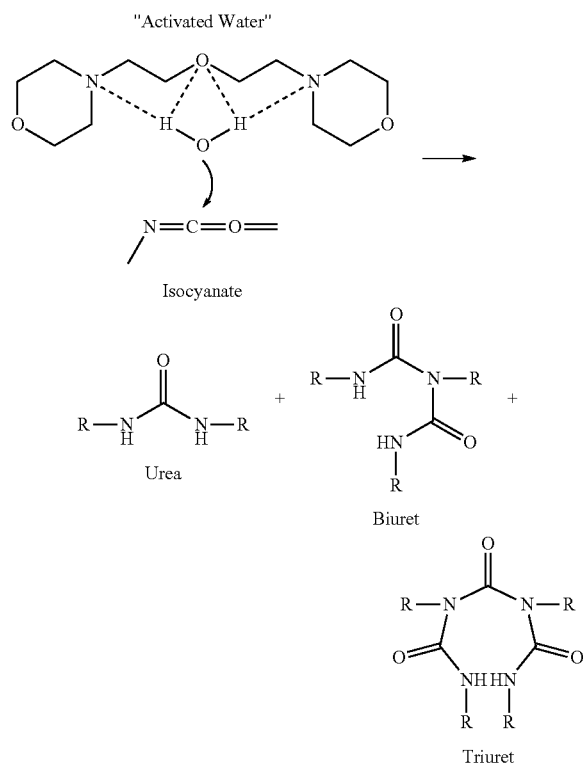

The mixture and/or mat may be free of, or include less than 5, 4, 3, 2, 1, 0.5, or 0.1, weight percent of, a formaldehyde resin, a methylolated urea, or oligomers formed therefrom, UF glue or binders, and/or a tackifying compound and/or adhesive, different from the isocyanate, based on 100 parts by weight of the mixture as a whole. In certain embodiments, the mat is substantially free of UF resin and/or PF resin. By "substantially free", it is meant that in these embodiments, the UF resin and/or PF resin is present in an amount no greater than about 15, no greater than about 10, no greater than about 5, or approaching or equaling 0, parts by weight, based on 100 parts by weight of the article, or any subrange in between. In other embodiments, the article is completely free of UF resin and/or PF resin. The mixture may include an amount of water of less than 10, 5, 4, 3, 2, 1, 0.5, or 0.1, weight percent, based on 100 parts by weight of the mixture as a whole.

In other embodiments, the mixture and/or mat may include one or more of the aforementioned chemistries in various amounts. For example, the mixture and/or mat may include 1, 2, 3, 4, 5, 6, 7, 8, 9, or 10 weight percent of one or more of a formaldehyde resin, a methylolated urea, or oligomers formed therefrom, UF glue or binders, etc. All values and ranges of values therebetween are also contemplated.

Continuous Process:

Referring back, the process is further defined as a continuous process for forming the mat on a line having at least two conveyors, e.g. a first conveyor and a second conveyor. The line and the two conveyors can be any known in the art of forming mats including the plurality of lignocellulosic particles. For example, the line and the conveyors may be those used to form UF, PF, and/or MUPF particleboards, as would be understood to those of skill in the art. The two conveyors are spaced from one another. This space may be described as a predefined or predetermined space or distance. This space may be from 1 to 20 cm or 5 to 20 cm. In various embodiments, this space is 1, 2, 3, 4, 5, 6, 7, 8, 9, 10, 11, 12, 13, 14, 15, 16, 17, 18, 19, or 20, cm, or any value or range of values therebetween. The two conveyors can be further defined as a first conveyor and a second conveyor. However, this disclosure it not limited to use of only two conveyors. More than one first conveyor can be utilized, e.g. a set of first conveyors. Similarly, more than one second conveyor can be utilized, e.g. a set of second conveyors. Alternatively, three, four, five, or more conveyors can be utilized. The orientation and operation of these conveyors may be the same as those traditionally understood by those of skill in the art, as described above.

Combining to Form a Mixture:

The process includes the step of combining the isocyanate, an isocyanate catalyst, and the plurality of lignocellulosic particles to form a mixture and the self-polymerization product of the isocyanate in-situ in the mixture. In other words, the self-polymerization product is formed during the continuous process and is not separately added to the any of the components or the mixture. Although additional amounts of self-polymerization product may be added to one or more of the components or the mixture, at least some of the self-polymerization product is formed in-situ, in this process. The terminology "in-situ" may describe that the self-polymerization product is formed when the mixture is formed (e.g. during formation of the mixture), after the mixture is formed, or both. For example, the self-polymerization product may be formed at any point in the process after the plurality of lignocellulosic particles and the isocyanate are in contact with each other (and potentially with the isocyanate catalyst). Without intending to be bound by any particular theory, it is believed that the isocyanate self-polymerizes when contacted with the moisture of the plurality of lignocellulosic particles The mixture may include a heterogeneous combination of the isocyanate, the isocyanate catalyst, and the plurality of lignocellulosic particles (and any other compounds described above or below) or may include a homogenous combination thereof. In various embodiments, the mixture is free of water or includes less than 10, 9, 8, 7, 6, 5, 4, 3, 2, 1, 0.05, or 0.01, weight percent of water, based on a total weight of the mixture.

The isocyanate, the isocyanate catalyst, and the plurality of lignocellulosic particles may be combined in any amounts and any order to form the mixture. Similarly, the isocyanate, the isocyanate catalyst, and the plurality of lignocellulosic particles may be combined at any temperature to form the mixture. The step of combining may occur below, at, or above room temperature (e.g. 25° C.). In various embodiments, the step of combining occurs at a temperature of from 100 to 200, from 110 to 190, from 120 to 180, from 130 to 170, from 140 to 160, from 140 to 150, from 140 to 180, from 145 to 175, from 150 to 170, from 155 to 165, or from 155 to 160,° F.

In one embodiment, the plurality of lignocellulosic particles is heated in a blender at a temperature of from 160 to 180° F. Subsequently, the isocyanate and the isocyanate catalyst are added to the blender in combination with the plurality of lignocellulosic particles to form the mixture. The mixture is then heated to maintain a temperature of from 140 to 150° F. The mixture is then removed from the blender and used to form the mat, as described in greater detail below.

The step of forming the mixture may include combining the isocyanate and the isocyanate catalyst to the plurality of lignocellulosic particles at the same time or at different times. In one embodiment, the isocyanate is applied to the plurality of lignocellulosic particles prior to the isocyanate catalyst. In another embodiment, the isocyanate catalyst is applied first. In still another embodiment, the isocyanate and the isocyanate catalyst are applied to the plurality of lignocellulosic particles simultaneously. The isocyanate and the isocyanate catalyst may be applied separately or as a premixed combination. In one embodiment, the isocyanate and the isocyanate catalyst is blended to form a system and the system is applied to the plurality of lignocellulosic particles. The isocyanate and isocyanate catalyst can be applied to the plurality of lignocellulosic particles by various processes, such as by mixing, tumbling, rolling, spraying, sheeting, blow-line resination, blending (e.g. blow-line blending), etc. For example, the isocyanate and isocyanate catalyst and the plurality of lignocellulosic particles can be mixed or milled together during the formation of the mixture, also referred to as a "furnish", as further described below.

Typically, the isocyanate and isocyanate catalyst are applied to the plurality of lignocellulosic particles by a spraying, an atomizing or a fogging process. The plurality of lignocellulosic particles having the isocyanate and isocyanate catalyst applied thereon can then be disposed on a carrier, and generally form (or define) the mixture or the mat. The mixture can then be formed into mat, such as by dropping the mixture onto a carrier, e.g. a conveyor belt, or, alternatively, the mat can be formed directly on the carrier. In other words, the plurality of lignocellulosic particles having the isocyanate and isocyanate catalyst applied thereon can be arranged on the carrier to form the mixture in various ways. The mixture can then be fed to a former, which generally forms the mixture into a mat having a predetermined width and a predetermined thickness with the plurality of lignocellulosic particles loosely oriented on the carrier. The predetermined width and thickness of the mat can be determined according to final widths and thicknesses desired for the article, as described further below. The mat can then be formed in various shapes, such as boards or panels, or formed into more complex shapes such as by molding or extruding the mat to form the article.

In certain embodiments, the isocyanate and isocyanate catalyst are sprayed, atomized, and/or fogged onto the plurality of lignocellulosic particles while the plurality of lignocellulosic particles is agitated in suitable equipment. Spraying, atomizing and fogging can occur via use of nozzles, such as one nozzle for each individual component supplied thereto, or nozzles that have two or more components premixed and supplied thereto. To maximize coverage of the plurality of lignocellulosic particles, the isocyanate and isocyanate catalyst can be generally applied by spraying droplets or atomizing or fogging onto the plurality of lignocellulosic particles as the plurality of lignocellulosic particles is being tumbled in a rotary blender or similar apparatus. As another example, the plurality of lignocellulosic particles can be coated with the isocyanate and isocyanate catalyst in a rotary drum blender equipped with at least one, typically at least two or three spinning disk atomizers. Tumblers, drums, or rollers including baffles can also be used. Shear force can be useful.

Alternatively, the plurality of lignocellulosic particles can be provided directly to the carrier, and the isocyanate and isocyanate catalyst can be applied to the plurality of lignocellulosic particles, e.g. by spraying or sheeting, to form the mixture. For example, the plurality of lignocellulosic particles can be disposed on a conveyor belt or a plate, and then sprayed with the isocyanate and isocyanate catalyst to form the mixture. Further, at least one of the isocyanate and isocyanate catalyst can already be present on the plurality of lignocellulosic particles, such that the remaining component can then be applied to the plurality of lignocellulosic particles.

The amount of the isocyanate and isocyanate catalyst to be applied and mixed with the plurality of lignocellulosic particles can be dependant upon several variables including, the specific isocyanate and isocyanate catalyst utilized, the size, moisture content and type of the plurality of lignocellulosic particles used, the intended use of the mat, and the desired properties of the mat. The resulting mixture is typically formed into a single or multi-layered mat that is compressed into, for example, OSB, PB, scrimber, MDF, or another mat of the desired shape and dimensions. The mixture can also be formed into more complex shapes, such as by molding or extruding the mixture.

Forming the Mat from the Mixture:

The process also includes the step of forming the mat from the mixture. The step of forming is not particularly limited and may include pressing under any amount of heat and/or pressure. For example, a continuous conveyor system may be used. In one embodiment, a continuously driven conveyor is passed beneath a dispersing device that disperses the mixture onto the conveyor. An endless mat may be formed on the conveyor by the dispersing device. The endless mat may be divided or cut using a saw or other cutting device. The continuous conveyor may include multiple independent conveyor belts upon which the mat is formed and/or travels. The Push Off Test values described in this disclosure maximize the continuity of the mat as it travels between independent conveyor belts and minimize a chance of breaking or failing. In one embodiment, the mixture includes a biuret of polymeric methylene-4,4'-diphenyl diisocyanate during the step of forming the mat from the mixture. In still a further embodiment, one or more process steps may be as described in U.S. Pat. No. 8,440,747, which is expressly incorporated herein by reference in one or more non-limiting embodiments.

In one embodiment, after the mixture is removed from the blender, the mixture is placed onto a conveyor and then pre-pressed to form an initial mat that is different from the final mat formed in this disclosure. The initial mat is then passed along one or more conveyor belts and is finally pressed in a heated press, e.g. at a temperature of from 325 to 375, from 325 to 350, or from 350 to 375,° F. Typically, this application of heat allows the isocyanate to form a thermoset material.

The mat can be formed in any suitable manner. For example, the mixture can be deposited on a plate-like carriage carried on an endless belt or conveyor from one or more hoppers spaced above the belt. When a multi-layer mat is formed, a plurality of hoppers can be used with each having a dispensing or forming head extending across the width of the carriage for successively depositing a separate layer of the mixture as the carriage is moved between the forming heads. The mat thickness will vary depending upon such factors as the size and shape of the plurality of lignocellulosic particles, the particular technique used in forming the mat, the desired thickness and density of the final mat and the pressure used during the press cycle. The thickness of the mat is usually about 5 times to about 20 times a final thickness of the mat. For example, for flakeboard or matboard panels of 0.5 inch thickness and a final density of about 35 lbs/ft$^3$, the mat usually will originally be about 3 inches to about 6 inches thick.

Typically, the plurality of lignocellulosic particles is loosely oriented in the mixture and mat. A carrier is typically provided, such as a conveyor belt or plate, and the mixture and eventual mat is disposed on the carrier. The mixture can either be formed directly on the carrier, and/or transferred to the carrier, after forming, e.g. in a tumbler. In one embodiment, the polyurethane, polyurea, and/or self-polymerization product substantially maintains orientation of the plurality of lignocellulosic particles in the mixture while on the carrier. There is no requirement that the orientation is maintained perfectly. For example, minor distortion may occur. In general, the self-polymerization product typically serves as a "tackifier" or as "sticky" glue, and can be used as a substitute for UF resins and/or PF resins, as well as for other conventional adhesives. As such, the mixture has tack or cold-tack.

In addition to the Push Off values described above, cold-tack can be determined in a variety of ways. For example, one can use a "slump" test, which employs a funnel packed full of the mixture, the funnel is then tipped onto a surface and removed, such that the mixture (in the shape of the funnel) remains on the surface. The funnel shaped mixture can then be observed for changes in shape over time, such as changes in angle due to slumping/collapsing of the funnel shaped mixture. Another example is referred to as a "snowball" test, where one can grab a handful of the mixture, make a ball of the mixture in hand, and toss the ball up and down to determine if the ball falls apart. Other suitable tests are described in ASTM D1037.

When the mixture is formed into the mat, the mixture typically substantially maintains the width and the thickness of the mat while the mat is on the carrier. As can be appreciated, when the carrier moves, such as by conveying, the mixture keeps the mat from falling apart due to vibrations. Vibrations can also occur, for example, if the carrier is a plate, and the plate is being moved to a press. Such vibrations can cause orientation problems with the lignocellulosic pieces, can cause reduced internal bond (IB) strength, and can cause other similar issues.

The mat is typically formed from the mixture by compressing the mixture at an elevated temperature and under pressure. Typically, at least pressure is applied to the mat for an amount of time sufficient to form the mat. Heat is also typically applied. Such conditions facilitate reaction of the isocyanate, as described above. By imparting tack, the mixture can reduce movement of the plurality of lignocellulosic particles in the mat, such as by reducing a chance that the plurality of lignocellulosic particles will blow apart when applying pressure to the mat. Specifically, speed of applying pressure to the mixture to form the mat can be increased relative to conventional pressing speed and/or pressures utilized to form conventional mats, which provides economic benefits, such as increased throughput, for manufacturers of the mat. The same tack imparted by the mixture is useful during movement of the mat, such as when being conveyed.

Typically, heat is applied to facilitate cure of the mixture. Press temperatures, pressures and times vary widely depending upon the shape, thickness and the desired density of the mat, the size and type of the plurality of lignocellulosic particles, e.g. wood flakes or sawdust, the moisture content of the plurality of lignocellulosic particles, and the specific components utilized. The press temperature, for example, can range from about 100° C. to about 300° C. To minimize generation of internal steam and the reduction of the moisture content of the final mat below a desired level, the press temperature is typically less than about 250° C. and most typically from about 180° C. to about 240° C., or any subrange in between. The pressure utilized is generally from about 300 to about 800 pounds per square inch (psi), or any subrange in between. Typically, the press time is from 120 to 900 seconds, or any subrange in between. The press time utilized should be of sufficient duration to at least substantially cure the mixture and to provide a mat of the desired shape, dimension and strength. For the manufacture of, e.g. flakeboard or PB panels, the press time depends primarily upon the panel thickness of the mat produced. For example, the press time is generally from about 200 seconds to about 300 seconds for a mat with about a 0.5 inch thickness.

Other suitable processes for forming the mat are described in the U.S. Pat. Nos. 6,451,101 to Mente et al.; 6,458,238 to Mente et al.; 6,464,820 to Mente et al.; 6,638,459 to Mente et al.; 6,649,098 to Mente et al., U.S. Pat. No. 6,344,165 to Coleman; U.S. Pat. No. 7,439,280 to Lu et al.; and U.S. Pat. No. 8,486,523 to Mente; and U.S. Publication No. 2005/0242459 to Savino et al., each of which is expressly incorporated herein by reference in various non-limiting embodiments.

Without being bound or limited to any particular theory, it is thought that presence of the self-polymerization product can reduce the amount of time required to form the mat relative to the amount of time required when the self-polymerization product is not utilized to form the mat. Specifically, it is thought that the self-polymerization product is useful for reducing cure time of the mixture during manufacture of the mat. As such, throughput of the mats can be increased via increased manufacturing speeds, e.g. press speeds (i.e., shorter pressing times). Other manufacturing benefits can also be realized, such as improved application of the components of the mixture to the plurality of lignocellulosic particles relative to conventional adhesives. In addition, it is believed that the mats include excellent physical properties. For example, in certain embodiments, the mats can have one or more of the following: increased bond strength, reduced edge swelling, improved release properties, improved flexural modulus, and/or reduced emissions, each relative to conventional mats. It is thought that the self-polymerization product can also improve the performance of other, optional, components utilized to form the mats, such as polyols through phase transfer catalysis and/or viscosity reducing mechanisms. In addition, gaps and transitions can be overcome by slow forming low molecular oligomers of polyurea/polyurethane providing tack.

Transferring the Mat from the First Conveyor to the Second Conveyor:

The process also includes the step of transferring the mat from the first conveyor to the second conveyor across a predetermined distance while maintaining the structure integrity of the mat. The process may include two or more steps of transferring across distances which may have dimensions as described above. The predetermined distance is typically the distance at which the at least two conveyors are spaced apart from each other. The maintenance of the structural integrity can be as described above wherein the mat does not break apart or break into pieces during as the mat travels over the predetermined space.

Additional Embodiments:

In one embodiment, the plurality of lignocellulosic particles is heated in a drier to control the moisture content. The plurality of lignocellulosic particles may then be mixed in a blender with the isocyanate and the isocyanate catalyst to form a mixture. The temperature of the mixture when exiting the blender may vary. The mixture is then typically transferred to formers, e.g. a core former or the surface layer former.

The formers typically lay the mixture on a first conveyor belt in such a way that when the mat is formed, it is formed with one, two, three, or more layers, typically with three layers. Top and bottom layers are typically described as surface layers while a middle layer is typically described as a core layer. However, additional first conveyors, e.g. a set of first conveyors, may also be used.

The first conveyer typically moves the mixture to a prepress wherein the mixture is compressed to form a composite. The composition is then typically carried by a second conveyor into a heated press wherein the composite is heated to form a mat. However, additional conveyors beyond the second conveyor may also be used. During transfer of composite from the first to the second (or additional) conveyors, the composite encounter transitions and/or gaps. The size of the gaps varies. If the composite does not have sufficient strength, the composite loses structural integrity while passing over the gaps/or transitions. The time it takes to make and move the composite is approximately 15 to 30 minutes.

EXAMPLES

Figures 1, 1A, 2:
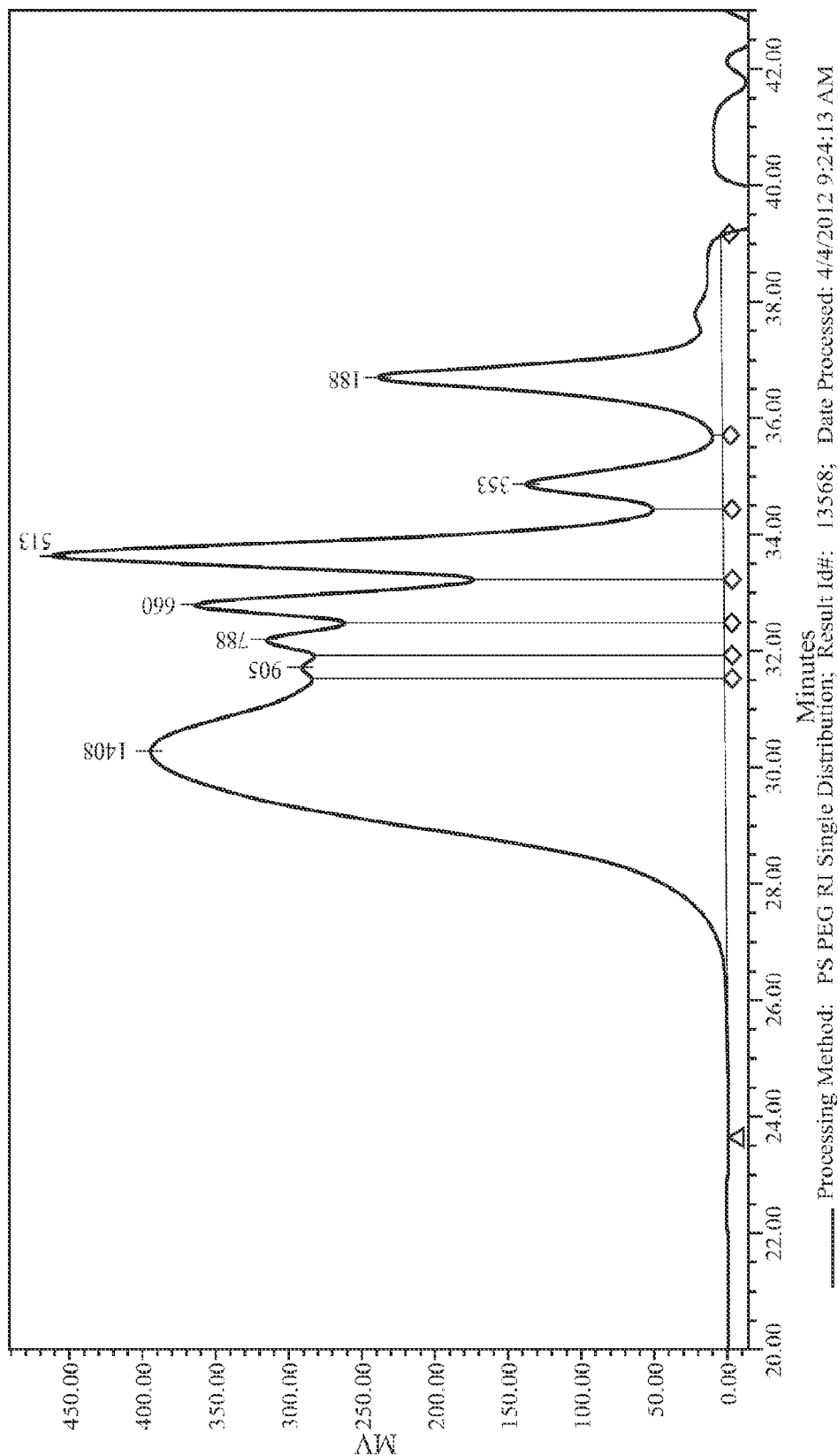
FIG. 2 is a table that includes Push-Off values as described in the Examples.
Figures 1, 1B:
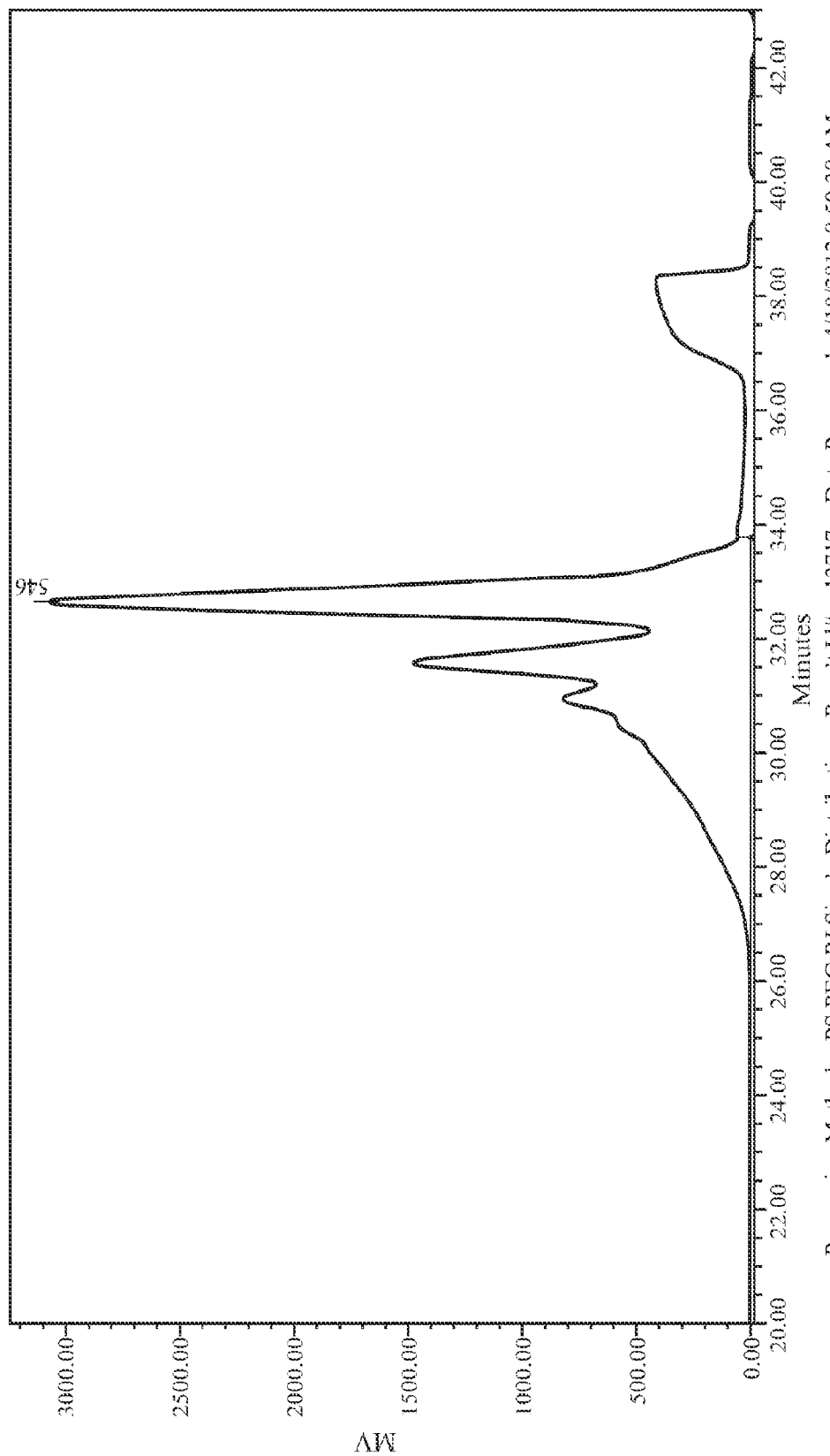
FIG. 1B is a gel permeation chromatogram showing pMDI alone.

A series of mats are formed according to this disclosure and evaluated to determine Push Off Test Values (see the Table of FIG. 2). Push-Off Test Values are determined to estimate a rate of formation of the self-polymerization product and the strength of the mat. More specifically, the push-off test was run 10 min after blending. Push-off work was done in a Hobart mixer with heating capabilities. In each preparation using Hobart mixer, 475 g of surface furnishing and 25-35 g of resin (isocyanate/catalyst/TEP/polyol) was used, as is understood in the art. The data set forth in the Table of FIG. 2 shows that by varying the amount of catalyst/TEP/polyol, push-off run can be customized at the time required for the mat to have enough integrity to remain intact on a continuous process line. The Push-Off Test Values are obtained using the process described above, i.e., the process described in the Journal of Adhesion, 1998, vol. 25, pages 31-44.

In Table 2, the values in parenthesis represent a weight percent of the particular component based on a total weight of the composition. The Catalyst used is UL-28, as known in the art. DEG represents diethylene glycol. BDO represents 1,4-butane diol. HDO represents 1,6-hexane diol. The prepolymer and hydroxy terminated prepolymer are both the reaction products of Pluracol 593 and monomeric MDI. The values, measured in centimeters, describe how much of the mat maintains integrity before a piece falls off to the floor.

Another series of mats are formed according to this disclosure and evaluated to determine IB, MOE, and MOR, and % MC Values (see the Table of FIG. 3). The IB values, MOE values, MOR values, and % MC values, are each obtained using ASTM D1037.

These mats were manufactured in a littleford blender, as understood by those of skill in the art. The temperature in the blender mix after blending was ~100° F. The mats were tested for mostly IB but a few for MOE and MOR. The data set forth in the Table of FIG. 3 show that addition of materials (catalyst/TEP/polyol) to pMDI does not significantly affect the IB, MOE/MOR values when comparing to control.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A continuous process for forming unitary mats on a line having at least two conveyors spaced from each other, said process comprising the steps of:
   A. combining an isocyanate, an isocyanate catalyst, triethyl phosphate, and a plurality of lignocellulosic particles to form a mixture and a self-polymerization product of the isocyanate in-situ in the mixture;
   B. forming one of the unitary mats from the mixture on a first conveyor;
   C. transferring the unitary mat from the first conveyor to a second conveyor across a distance while maintaining structural integrity of the unitary mat; and
   D. continuously forming the unitary mats by steps (A)-(C) on said line having at least two conveyors,
   wherein the lignocellulosic particles have a moisture content of 0.5 to 30 weight percent of water, and wherein said continuous process is free of a step of adding water to the isocyanate or the isocyanate catalyst.

2. The continuous process of claim 1 wherein the at least two conveyors are spaced apart from each other by the predetermined distance of from 5 to 20 cm.

3. The continuous process of claim 1 wherein the isocyanate is polymeric methylene-4,4'-diphenyl diisocyanate.

4. The continuous process of claim 1 wherein the isocyanate catalyst is present in a carrier polyol.

5. The continuous process of claim 4 wherein the carrier polyol has a weight average molecular weight of from 50 to 2000 g/mol and is optionally a polyether polyol.

6. The continuous process of claim 1 wherein the mixture further comprises a polyurethane, polyurea, or combinations thereof.

7. The continuous process of claim 1 wherein the mixture comprises less than 1 weight percent of water.

8. The continuous process of claim 1 wherein the plurality of lignocellulosic particles comprises 0.5 to 20 weight percent of water.

9. The continuous process of claim 1 wherein the step of combining occurs at a temperature of from 140° F. to 180° F.

10. The continuous process of claim 1 wherein the step of forming the mat occurs at a temperature of from 325° F. to 375° F. such that a thermoset polyurethane and/or polyurea is formed.

11. The continuous process of claim 1 wherein the mixture comprises a reactive intermediate of an isocyanate polymerization reaction formed in-situ prior to the step of forming the mat.

12. The continuous process of claim 1 wherein the mixture comprises a biuret of polymeric methylene-4,4'-diphenyl diisocyanate during said step of forming the mat from the mixture.

13. The continuous process of claim 1 wherein the mixture is free of a formaldehyde resin.

14. The continuous process of claim 1 wherein the mixture is free of a tackifying compound and/or adhesive, different from the isocyanate and/or the self-polymerization product of the isocyanate.

15. A unitary mat having a length and width and comprising:
 a plurality of lignocellulosic particles;
 a self-polymerization product of an isocyanate; and
 triethyl phosphate;
 wherein said plurality of lignocellulosic particles has a moisture content of 0.5 to 30 weight percent of water; and
 wherein said mat is free of a tackifying agent and/or adhesive different from said self-polymerization product of said isocyanate.

16. The unitary mat of claim 15 that maintains structural integrity when transferred from a first conveyor to a second conveyor across a distance during a continuous process of forming.

17. The unitary mat of claim 15 that is free of a formaldehyde resin and/or a reaction product of a formaldehyde resin and an isocyanate.

* * * * *